DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 24, 1970

880 O.G. 1163

T880,011
ENEROGRAPHIC PROCESS AND ELEMENT
Jörg Jaskowsky, Ruit, Wurttemberg, Germany
Filed Apr. 8, 1970, Ser. No. 26,703
Int. Cl. G03c *1/52, 5/00*
U.S. Cl. 96—27
1 Sheet Drawing. 15 Pages Specification

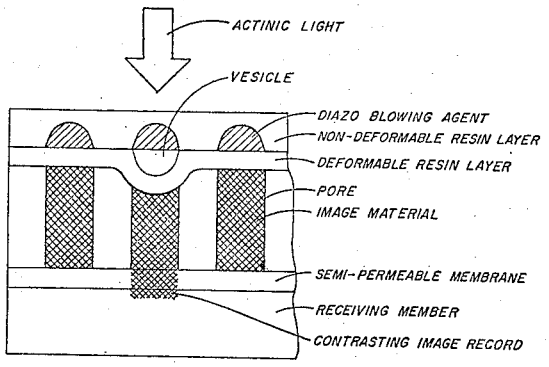

Visible images can be prepared by an enerographic image-transfer process in which, an exposure to activating rays, an image material, preferably colored such as a dye or pigment, is selectively transported from an enero-responsive element including the image material and a radiation-sensitive blowing agent, a diazonium salt for example, to a contiguous receiver member like a paper sheet. When the element is imagewise exposed, the blowing agent decomposes to yield a propellant gas in exposed regions to actively transport image material to the receiving sheet and define an image thereon corresponding to the imagewise exposure. Elements useful in the image-forming process can include a transversely porous support material containing an image material within the pores, a pressure-deformable, fluid (i.e., gaseous and liquid) impermeable layer sealingly contiguous to a porous surface of the support, a radiation-sensitive blowing agent substantially discretely distributed on the pressure-deformable layer and a radiation-permeable, fluid-impermeable, substantially non-pressure deformable layer over and contiguous to the blowing agent and intervening portions of the pressure-deformable layer, encapsulating the blowing agent between these layers.

Nov. 24, 1970 J. JASKOWSKY T880011
ENEROGRAPHIC PROCESS AND ELEMENT
Filed April 8, 1970
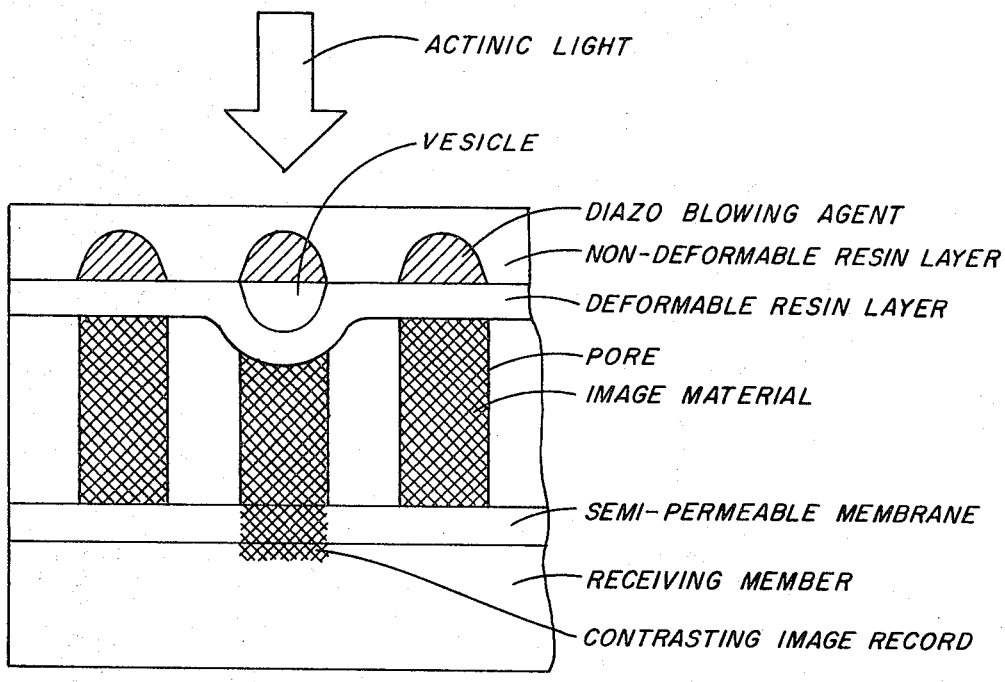
JÖRG JASKOWSKY
INVENTOR.
BY Dennis M. DeLeo
ATTORNEY